(12) United States Patent
Ozaki (10) Patent No.: US 10,008,909 B2
(45) Date of Patent: Jun. 26, 2018

(54) MOTOR DRIVING CONTROL DEVICE FOR VEHICLE

(71) Applicant: ASMO CO., LTD., Kosai, Shizuoka-pref. (JP)

(72) Inventor: Kentaro Ozaki, Toyokawa (JP)

(73) Assignee: ASMO CO., LTD., Kosai (JP)

( * ) Notice: Subject to any disclaimer, the term of this patent is extended or adjusted under 35 U.S.C. 154(b) by 329 days.

(21) Appl. No.: 15/098,322

(22) Filed: Apr. 14, 2016

(65) Prior Publication Data

US 2016/0315524 A1 Oct. 27, 2016

(30) Foreign Application Priority Data

Apr. 24, 2015 (JP) .................................. 2015-089347
Mar. 15, 2016 (JP) .................................. 2016-051488

(51) Int. Cl.
| | | |
|---|---|---|
| *H02K 9/22* | (2006.01) | |
| *H02K 5/22* | (2006.01) | |
| *H02K 5/16* | (2006.01) | |
| *H02K 11/01* | (2016.01) | |
| *H02K 11/33* | (2016.01) | |
| *H02K 11/40* | (2016.01) | |

(52) U.S. Cl.
CPC .............. *H02K 9/22* (2013.01); *H02K 5/163* (2013.01); *H02K 5/225* (2013.01); *H02K 11/01* (2016.01); *H02K 11/33* (2016.01); *H02K 11/40* (2016.01)

(58) Field of Classification Search
CPC .......... H02K 9/22; H02K 11/01; H02K 11/33; H02K 11/40; H02K 5/163; H02K 5/225
See application file for complete search history.

(56) References Cited

U.S. PATENT DOCUMENTS

| | | | | | |
|---|---|---|---|---|---|
| 4,554,473 | A | * | 11/1985 | Muller ................... | H02K 29/08 310/64 |
| 5,760,512 | A | * | 6/1998 | Ohi ....................... | F04D 29/668 310/216.115 |
| 5,774,302 | A | * | 6/1998 | Elsaesser ............. | G11B 17/038 360/98.07 |
| 5,969,445 | A | * | 10/1999 | Horiuchi ................ | H02K 11/40 310/64 |

(Continued)

FOREIGN PATENT DOCUMENTS

| | | |
|---|---|---|
| JP | H09-149602 A | 6/1997 |
| JP | H11-89198 A | 3/1999 |

(Continued)

*Primary Examiner* — Robert W Horn
(74) *Attorney, Agent, or Firm* — SOLARIS Intellectual Property Group, PLLC (57) ABSTRACT

A motor driving control device for a vehicle that includes: a circuit board on which is packaged a circuit that generates the voltage applied to windings of a motor, the circuit board having a ground region; a heat dissipating member that dissipates heat from the circuit board, and that is electrically connected to the ground region on the circuit board; a supporting member that holds the circuit board and a bearing member of the motor, and that has an insulating surface; and an electrically-conductive member that is provided at a surface of the supporting member, and that, by electrically connecting the bearing member and the heat dissipating member, grounds a rotating body, an output shaft and the bearing member of the motor.

5 Claims, 6 Drawing Sheets

(56) References Cited

U.S. PATENT DOCUMENTS

| | | | | |
|---|---|---|---|---|
| 7,922,467 | B2* | 4/2011 | Swanson | F04D 25/0606 310/68 R |
| 8,664,825 | B2* | 3/2014 | Ono | H02K 5/02 310/196 |
| 9,385,569 | B2* | 7/2016 | Huang | H02K 3/28 |
| 9,634,547 | B1* | 4/2017 | Orlowski | H02K 11/0089 |
| 9,899,892 | B2* | 2/2018 | Berkouk | H02K 5/225 |
| 9,949,384 | B2* | 4/2018 | Yamanaka | H05K 5/0026 |
| 2002/0190588 | A1* | 12/2002 | Koenigs | H02K 11/40 310/71 |
| 2011/0068646 | A1* | 3/2011 | Terakubo | H02K 5/02 310/71 |
| 2016/0315524 | A1* | 10/2016 | Ozaki | H02K 5/163 |
| 2017/0015347 | A1* | 1/2017 | Asao | B62D 5/0406 |
| 2017/0126104 | A1* | 5/2017 | Yamanaka | H02K 11/25 |
| 2017/0133904 | A1* | 5/2017 | Takayama | H02K 5/16 |
| 2017/0288507 | A1* | 10/2017 | Otsuka | H02K 11/33 |

FOREIGN PATENT DOCUMENTS

| | | | |
|---|---|---|---|
| JP | 2001-069740 A | 3/2001 | |
| JP | 2001-251833 A | 9/2001 | |

* cited by examiner

MOTOR DRIVING CONTROL DEVICE FOR VEHICLE

CROSS-REFERENCE TO RELATED APPLICATION

This application claims priority under 35 USC 119 from Japanese Patent Application No. 2015-089347 filed Apr. 24, 2015 and Japanese Patent Application No. 2016-051488 filed Mar. 15, 2016, disclosures of which are incorporated by reference herein.

BACKGROUND

Field of the Invention

The present disclosure relates to a motor driving control device for a vehicle.

Related Art

A motor driving control device that controls the rotation of a motor converts a sinusoidal signal into a rectangular wave shaped signal by a circuit such as a comparator or the like, in a case in which, for example, a Hall sensor outputs a sinusoidal signal that corresponds to a magnetic field that varies in accordance with the rotation of the output shaft of the motor. Further, the motor driving control device computes the rotational position of the output shaft by detecting the point where the rectangular wave shaped signal changes from high level to low level or from low level to high level respectively.

A circuit, such as a comparator or the like that converts an analog signal into a digital signal, converts an analog signal into a rectangular wave shaped digital signal by comparing the analog signal with a threshold value having a predetermined voltage value.

Further, also in the controlling of the voltage that is applied to the windings of the motor, the computing section of the motor driving control device computes the duty ratio of the rectangular wave relating to the voltage that is applied to the windings of the motor, by comparing a control voltage and a counter value whose voltage varies at a regular rhythm.

Accordingly, if the potentials of the sensor and the computing section of the motor driving control device are not the same, there is the concern that problems will arise in the operations of the motor driving control device, such as the converting of a sinusoidal signal to a rectangular wave shaped signal, and the computing of the duty ratio of the voltage that is applied to the motor, and the like, cannot be carried out normally, or the like.

Further, there are cases in which the motor driving control device is provided integrally with the motor main body. In such cases, it is desirable for the potential of the motor, at other than the places where voltage is applied such as the windings of the motor or the like, and the potential of the computing section of the motor driving control device, to be the same.

Japanese Patent Application Laid-Open (JP-A) No. 2001-251833 discloses a brushless motor that balances the potentials of the motor other than at the places where voltage is applied, and the potential of the motor driving control device, by electrically connecting a yoke that structures the exterior of the motor, and the output shaft of the motor, and a bearing portion of the output shaft to a ground region of a circuit board.

SUMMARY

However, in the structure disclosed in JP-A No. 2001-251833, the yoke and the bearing portion are electrically connected to the ground region of the circuit board via a shield plate, that is a metal plate that is disposed at the inner wall surface of an upper case, and clip members and a bus bar for wiring. The plural structures that are the shield plate, the clip members, the bus bar for wiring and the like are needed, and the path by which the yoke is electrically connected to the ground region of the circuit board is complex.

In consideration of the above-described circumstances, an object of the present disclosure is to provide a motor driving control device for a vehicle that can aim for balance of the potentials of respective portions thereof by a simple structure.

A motor driving control device for a vehicle of a first aspect includes: a motor having a rotating body that rotates due to application of a magnetic field generated by voltage applied to windings, an output shaft that is structured integrally with the rotating body, and a bearing member that holds the output shaft such that the output shaft rotates freely; a circuit board on which is packaged a circuit that generates the voltage applied to the windings, and that has a ground region; a heat dissipating member that dissipates heat of the circuit board, and that is electrically connected to the ground region that is on the circuit board; a supporting member that holds the circuit board and the bearing member, and whose surface is insulative; and an electrically-conductive member that is provided at a surface of the supporting member, and that, by electrically connecting the bearing member and the heat dissipating member, grounds the rotating body, the output shaft and the bearing member.

In the first aspect, the electrically-conductive member, that electrically connects the bearing member of the motor and the heat dissipating member that is grounded, is disposed at the surface of the supporting member that is insulative.

The electrically-conductive member can be structured by a thin metal plate being disposed on the surface of the supporting member, or due to metal plating being carried out on the surface of the supporting member. Therefore, in the present disclosure, a motor driving control device for a vehicle, that can aim for balance of the potentials of the respective portions thereof by a simple structure, can be obtained.

A motor driving control device for a vehicle of a second aspect is the motor driving control device for a vehicle of the first aspect, wherein the supporting member has a bearing member holding portion that holds the bearing member, and a first end of the electrically-conductive member extends to an inner wall of the bearing member holding portion and planarly-contacts a peripheral direction side surface of the bearing member, and, at a time when the circuit board, on which the heat dissipating member is packaged, is held by the supporting member, a second end of the electrically-conductive member contacts the heat dissipating member.

In the second aspect, due to the first end of the electrically-conductive member planarly-contacting the peripheral direction side surface of the bearing member, the rotating body and the output shaft and the bearing member of the motor can be electrically connected reliably.

A motor driving control device for a vehicle of a third aspect is the motor driving control device for a vehicle of the second aspect, wherein the inner wall of the bearing member hold portion has an accommodation recess to hold the bearing member, and the first end of the electrically-conductive member is accommodated in the accommodation recess of the bearing member hold portion.

In the third aspect, the first end of the electrically-conductive member is accommodated in the accommodation recess of the bearing member hold portion. Accordingly, the first end of the electrically-conductive member can planarly-contacts with the peripheral direction side surface of the bearing member.

A motor driving control device for a vehicle of a fourth aspect is the motor driving control device for a vehicle of the second aspect or the third aspect, wherein the heat dissipating member has a region that faces the supporting member at the time when the circuit board, on which the heat dissipating member is packaged, is held by the supporting member, and, at the time when the circuit board, on which the heat dissipating member is packaged, is held by the supporting member, the second end of the electrically-conductive member is nipped by the supporting member and the region, that faces the supporting member, of the heat dissipating member.

In the fourth aspect, due to the other end of the electrically-conductive member being nipped by the supporting member and the heat dissipating member, the electrical connection between the rotating body, the output shaft and the bearing member of the motor as well as the electrically-conductive member, and the heat dissipating member that is grounded, can be made to be reliable. As a result, the rotating body, the output shaft and the bearing member of the motor can be grounded.

A motor driving control device for a vehicle of a fifth aspect is the motor driving control device for a vehicle of any of the first aspect to the fourth aspect, wherein a potential of the ground region of the circuit board is a ground potential due to a connector member that is electrically connected to the ground region.

In the fifth aspect, the ground region of the circuit board is grounded via the connector member that is electrically connected to the ground region. Accordingly, the potentials of the rotating body, the output shaft, the bearing member, the electrically-conductive member, the heat dissipating member and the ground region of the circuit board can be released to aim for balance of the potentials of the respective portions.

DETAILED DESCRIPTION

Figure 1:
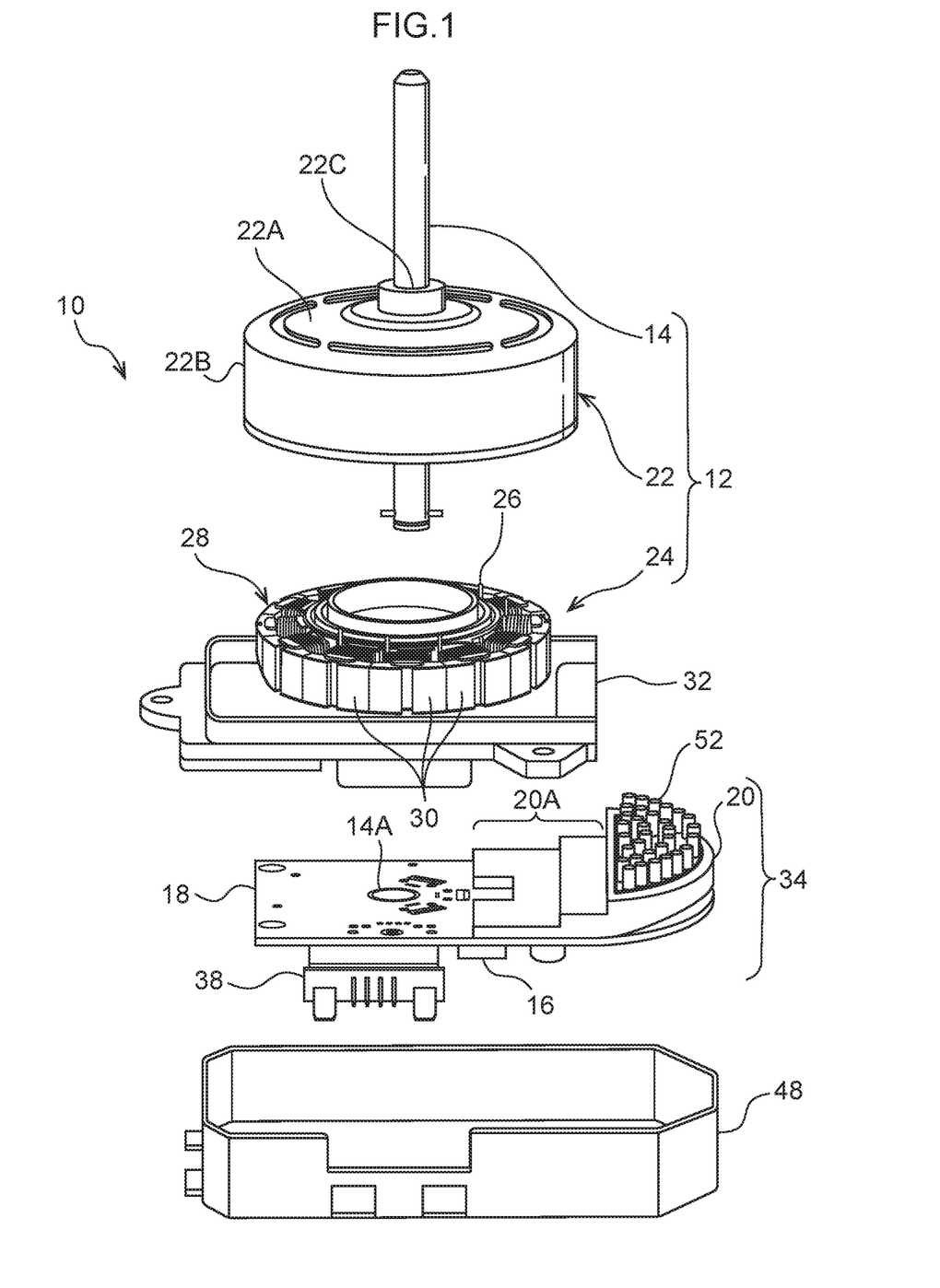
FIG. 1 is an exploded perspective view showing, in a disassembled state, a motor driving control device for a vehicle relating to an embodiment.
Figure 2:
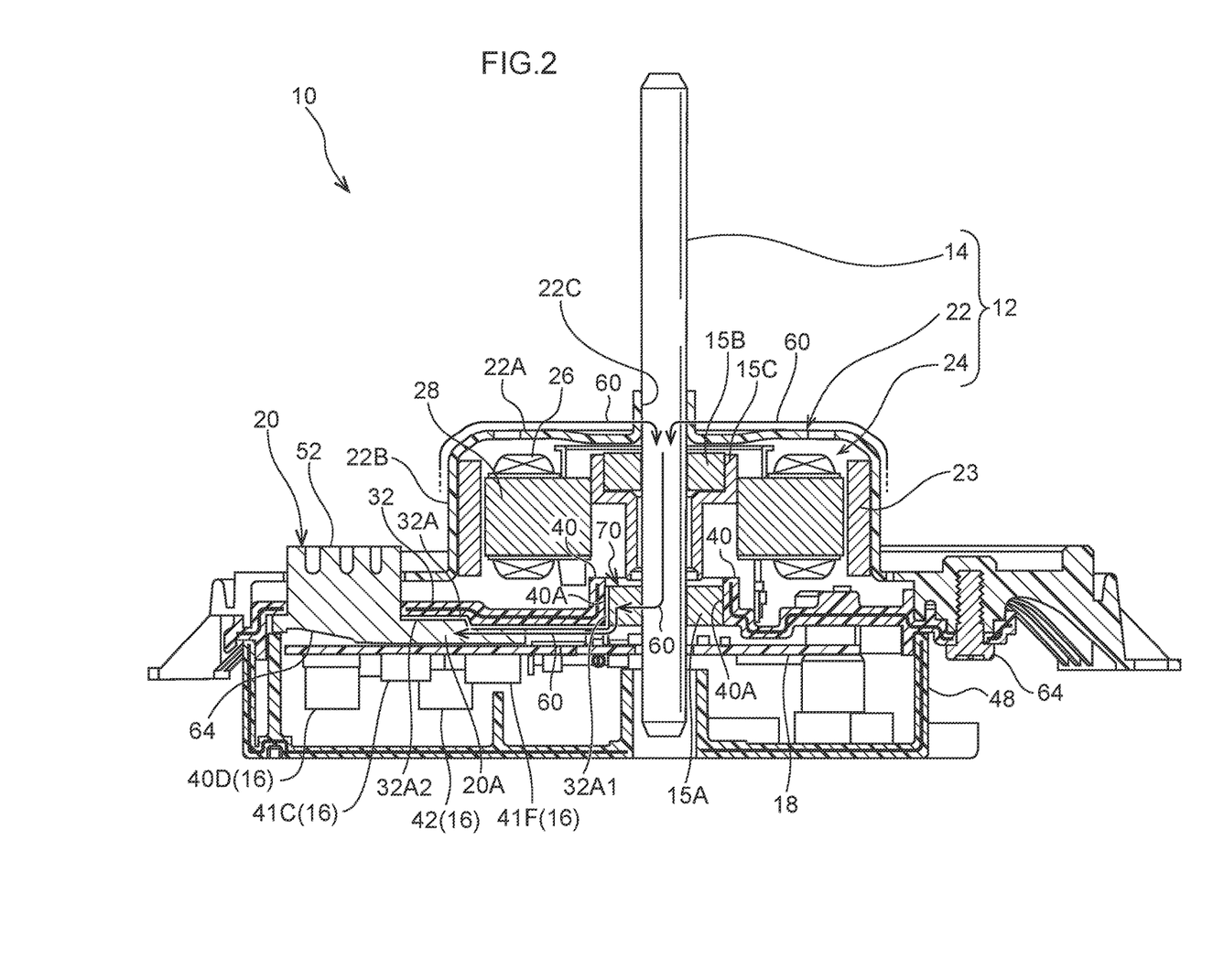
FIG. 2 is a cross-sectional view showing a cross-section in which the motor driving control device for a vehicle relating to the embodiment is cut along the axial direction of a motor.

A motor driving control device for a vehicle relating to an embodiment is described next by using FIG. 1 through FIG. 6. As shown in FIG. 1 and FIG. 2, a motor driving control device 10 for a vehicle relating to the present embodiment is, as an example, a unit of a blower motor that is used in the blowing of air by an air conditioner that is installed in a vehicle. In detail, the motor driving control device 10 for a vehicle has a motor 12 that rotates an output shaft 14 around the axis thereof, and a motor driving control device 34 that includes a circuit element 16 that controls the rotation of the motor 12, a circuit board 18, and a heat sink 20 that serves as a heat dissipating member for dissipating heat of the circuit element 16. Namely, at the motor driving control device 10 for a vehicle, the motor 12 and the motor driving control device 34, that controls the rotation of the motor 12, are structured integrally.

(Motor 12)

The motor 12 includes, as main elements thereof, the output shaft 14, a rotor 22 and a stator 24.

The output shaft 14 is structured by carrying out a surface treatment, such as carburization treatment or the like, on a cylindrical steel material. The output shaft 14 is axially-supported so as to rotate freely, by a lower bearing member 15A and an upper bearing member 15B.

Further, the rotor 22 is formed in the shape of a cylindrical tube having a bottom and whose one end is open, and has a bottom wall 22A that is disc-shaped and a peripheral wall 22B that is bent and extends from the outer peripheral end of the bottom wall 22A toward one end side of the rotor 22. Moreover, an insert hole 22C through which the output shaft 14 is inserted is provided in the central portion of the bottom wall 22A. The rotor 22 and the output shaft 14 can rotate integrally due to the output shaft 14 being press-fit into this insert hole 22C. A rotor magnet 23 is provided at the inner side of the peripheral wall 22B.

Further, the stator 24 is structured due to windings 26 that are electrically conductive being wound around a stator core 28 that is formed in an annular shape. The stator 24 is disposed at the radial direction inner side of the peripheral wall 22B of the rotor 22. The rotor 22 receives the magnetic field generated by the stator 24, and can rotate together with the output shaft 14. In detail, the stator 24 is an electromagnet in which the windings 26 are wound on core members 30 that structure the stator core 28, and structures three phases that are a U-phase, a V-phase and a W-phase. Each of the U-phase, the V-phase and the W-phase of the stator 24 generates a so-called rotating magnetic field due to the polarity of the magnetic field generated by the electromagnet being switched by control of the motor driving control device 34 that is described later. Further, the stator 24 is mounted to the motor driving control device 34 via an upper case 32 that serves as a case.

(Circuit Board 18 and Circuit Element 16)

The circuit board 18 is formed in a rectangular plate shape, and, together with the circuit element 16 and the heat sink 20 that is described in detail later and the like, structures the motor driving control device 34 (a circuit device). A connector 38, to which a control device such as an ECU (Electronic Control Unit) or the like is connected via a harness and a connector, is mounted to the circuit board 18. Moreover, an inverter circuit, that switches the power source voltage and generates voltage for application to the windings 26 of the respective phases of the stator 24 of the motor, and a microcomputer that controls this inverter circuit on the basis of command signals from the ECU, and the like are packaged on the circuit board 18.

The inverter circuit is structured by a FET (Field Effect Transistor) that is a switching element. Because the heat that is generated by the FET while operating is marked, the heat sink 20 that is a heat dissipating member is mounted near to the place of the circuit board 18 where the inverter circuit is packaged.

As shown in FIG. 2, due to a lower case 48 that serves as a case being mounted to the upper case 32, the circuit board 18 is accommodated between the lower case 48 and the upper case 32.

(Heat Sink 20)

The heat sink 20 is made of a metal that has good thermal conductivity such as aluminum or the like, and is formed in a substantially rectangular plate shape as seen from the plate thickness direction of the circuit board 18. Further, plural projections 52 are formed along the long-side direction of the heat sink 20 at one end in the short-side direction of the heat sink 20. The projections 52 are formed in the shapes of cylinders that project-out in the direction of moving away from the circuit board 18. Due to these plural projections 52 being provided, the surface area of the heat sink 20 increases, and the heat dissipating performance of the heat sink 20 is improved. Further, as shown in FIG. 2, in the state in which the circuit board 18 is accommodated between the lower case 48 and the upper case 32, the projections 52 are exposed from the upper case 32.

As shown in FIG. 1, the heat sink 20 is structured such that, in the state of being mounted to the circuit board 18, the end portion, that is at the side opposite the side at which the projections 52 are provided, is high as compared with the circuit board 18. This end portion of the heat sink 20 is the region that faces the upper case 32, when this end portion is held, together with the circuit board 18, by the upper case 32 and the lower case 48 that are described later. This end portion of the heat sink 20 is also the region that contributes to the circuit board 18 being held by the upper case 32 and the lower case 48 without the circuit board 18 contacting the surface of the upper case 32. Further, because the circuit board 18 is held due to the heat sink 20 facing to the upper case 32, there is no need to fix the circuit board 18 by nipping the circuit board 18 by members having the elastic force of a spring, such as clip members or the like. As a result, needless stress arising at the circuit board 18 is suppressed, and damage to the circuit board 18 can be prevented.

As described later, the heat sink 20 is electrically connected to the ground region of the circuit board 18, and the potential of the heat sink 20 is maintained at the same level as that of the ground region of the circuit board 18.

(Upper Case 32, Lower Case 48 and Electrically-Conductive Plate 32A)

The upper case 32 and the lower case 48 are members for housing the circuit board 18 in the space that is formed due to the upper case 32 and the lower case 48 being combined. In the present embodiment, as shown in FIG. 1 and FIG. 2, the circuit board 18, to which the heat sink 20 is mounted, is combined with the upper case 32 in a state in which the circuit board 18 is placed in the lower case 48, and the upper case 32 and the lower case 48 are fastened by fixing bolts 64 that are shown in FIG. 2.

In consideration of the concern that the surfaces of the upper case 32 and the lower case 48 may contact the circuit board 18, the surfaces of the upper case 32 and the lower case 48 are formed integrally of a substance that is insulative such as a synthetic resin or the like, or are formed by a core member, that is formed of a metal such as an iron alloy like steel or the like, or a light alloy, or a copper alloy like brass or the like, being coated by a synthetic resin or the like. Further, the upper case 32 has a lower bearing member holding portion 40 that, at one surface thereof, holds the circuit board 18, and at the central portion thereof, holds the lower bearing member 15A. The lower bearing member holding portion 40 is a region that is shaped as a cylindrical tube that projects-out toward the side, to which the motor 12 is mounted, of the lower case 32. Because an inner wall of the lower bearing member holding portion 40 has a circular opening portion at which the lower bearing member 15A is mounted, the inner wall of the lower bearing member holding portion 40 configures an accommodation recess 70 to hold the lower bearing member 15A. The lower bearing member holding portion 40 may be shaped as a polygonal column that has a polygonal opening portion, rather than the cylindrical tube that has the circular opening portion, in the case where the lower bearing member holding portion 40 can hold the lower bearing member 15A.

Figure 3:
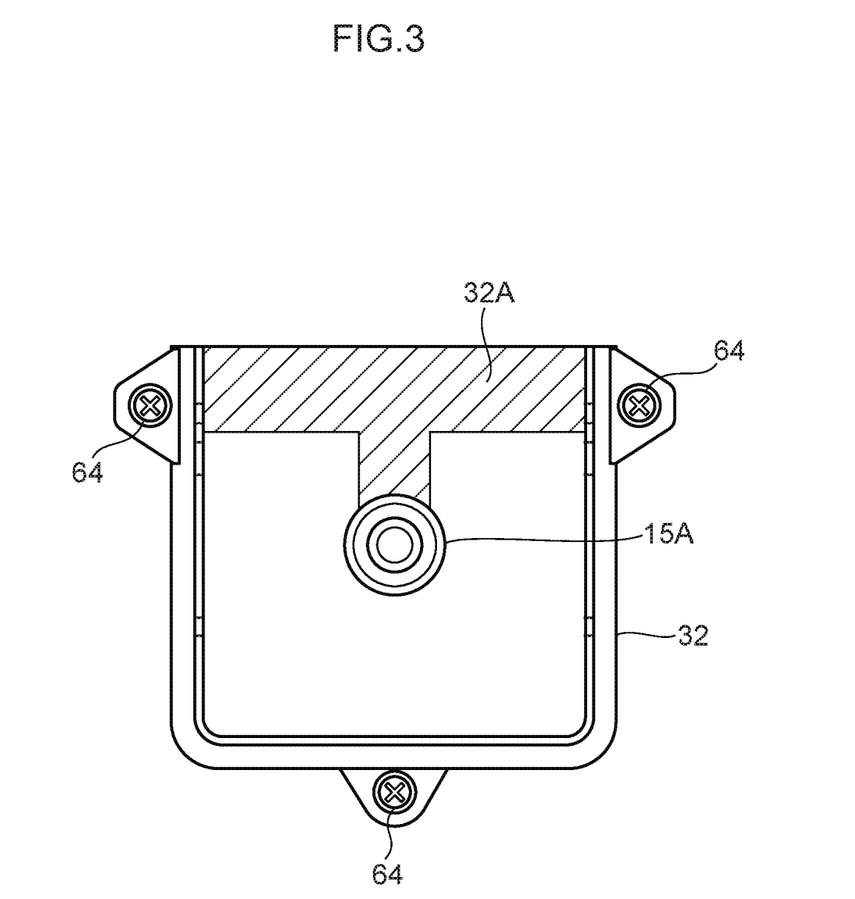
FIG. 3 is a drawing in which an upper case is seen from a side to which a circuit board is mounted.

In the present embodiment, as shown in FIG. 2 and FIG. 3, an electrically-conductive plate 32A, that is electrically conductive and is formed from a metal plate or by metal plating or the like, is provided at the surface of the upper case 32 from the lower bearing member 15A to the region where the heat sink 20 is faces the upper case 32.

As shown in FIG. 2, the electrically-conductive plate 32A is provided at the lower side of the upper case 32, i.e., at the side that structures the space where the circuit board 18 is housed. One end 32A1 of the electrically-conductive plate 32A is accommodated in the accommodation recess 70 of the lower bearing member holding portion 40 and contacts the peripheral direction side surface of the lower bearing member 15A by extending all the way to an inner wall 40A of the lower bearing member holding portion 40. Another end 32A2 of the electrically-conductive plate 32A is nipped between an end portion 20A of the heat sink 20 and the upper case 32, at the time when the upper case 32 and the lower case 48 are fastened together by the fixing bolts 64 with the circuit board 18, to which the heat sink 20 is attached, being nipped therebetween. Due thereto, the lower bearing member 15A and the heat sink 20 are electrically connected. The lower bearing member 15A contacts the output shaft 14 that is structured integrally with the rotor 22. Therefore, in the present embodiment, the rotor 22, the output shaft 14, the lower bearing member 15A, the electrically-conductive plate 32A and the heat sink 20 are electrically connected.

The lower bearing member 15A is, for example, a radial ball bearing or the like, and, other than the seal that prevents flowing-out of grease that is the encapsulated lubricant, is structured from an iron alloy, and is electrically-conductive from the central portion thereof, that is mounted to the output shaft 14, to the peripheral direction side surface thereof.

FIG. 3 is a view (a bottom view) in which the upper case 32 is seen from the side to which the circuit board 18 is mounted. As shown in FIG. 3, the portion of the electrically-conductive plate 32A, which portion is nipped-in by and contacts the heat sink 20, is made to be large to the extent that the dimensions of the upper case 32 and the heat sink 20 permit, and electrically contacts the heat sink 20 reliably.

Note that, when the electrically-conductive plate 32A that is shown in FIG. 2 contacts a place that is other than the ground region of the circuit board 18, the circuit on the circuit board 18 shorts, and therefore, the electrically-conductive plate 32A must be packaged so as to not directly contact the circuit board 18. In the case shown in FIG. 2, the electrically-conductive plate 32A is packaged with a gap, that can ensure the insulating ability, between itself and the circuit board 18. However, in a case in which it is difficult to provide, between the electrically-conductive plate 32A and the circuit board 18, a gap such as that illustrated in FIG.

2 and that can ensure the insulating ability, a resin or paint that is insulative may be applied to places of the electrically-conductive plate 32A shown in FIG. 3 where there is the concern of contact with the circuit board 18.

Because the upper bearing member 15B is near the windings 26 of the stator 24 to which voltage is applied, in order to ensure insulation between the upper bearing member 15B and the windings 26, the upper bearing member 15B may be covered by a sleeve 15C that is substantially shaped as a cylindrical tube and that is structured from an engineered plastic or the like that is insulative and is strong.

In FIG. 2, the electrically-conductive plate 32A is provided at the lower side of the upper case 32, i.e., at the side that structures the space where the circuit board 18 is housed. However, the electrically-conductive plate 32A may be provided at the upper side of the upper case 32, and one end 32A1 of the electrically-conductive plate 32A may contact the lower bearing member 15A, and the other end 32A2 of the electrically-conductive plate 32A may contact the heat sink 20. In this case, by extending the other end of the electrically-conductive plate 32A so as to bend-back from the upper side to the lower side of the upper case 32, this other end 32A2 is nipped between the upper case 32 and the end portion of the heat sink 20 that faces the upper case 32.

(Ground Region 54A of Circuit Board 18 and Heat Sink 20)

Figure 4:
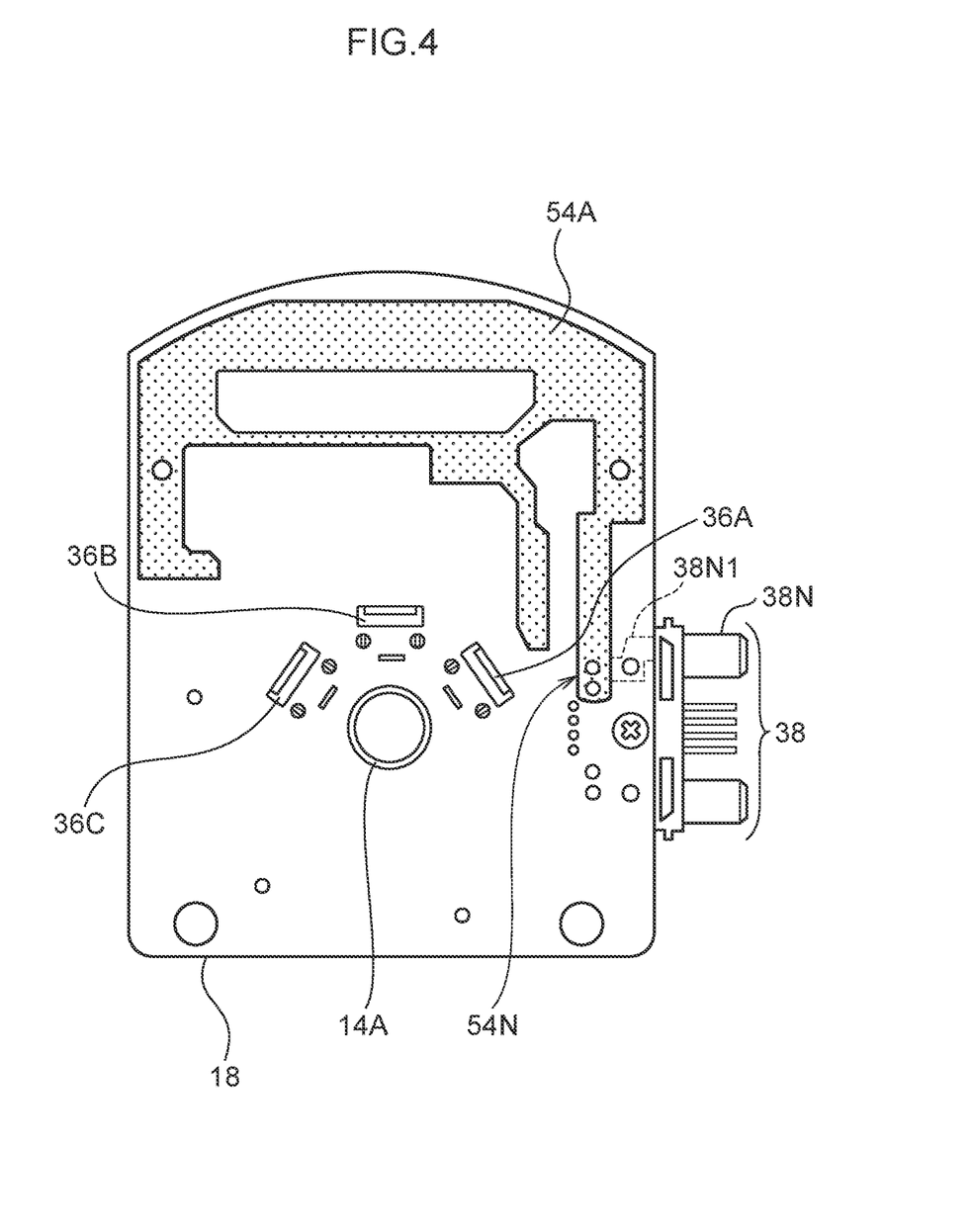
FIG. 4 is a drawing showing an example of a ground region that is a region of ground potential at the circuit board relating to the embodiment.

FIG. 4 is a drawing illustrating an example of a ground region 54A that is a region of ground potential at the circuit board 18 relating to the present embodiment. In FIG. 4, the ground region 54A is provided at the reverse surface at the side where the FET and the like, that have marked heat generation, are packaged. The ground region 54A is electrically connected via a terminal connection portion 54N and a communication terminal 38N1 to a ground terminal 38N that the connecter 38 has, and the ground terminal 38N of the connecter 38 is grounded at the vehicle main body via a harness. The terminal connection portion 54N may be a via hole or a joining member, such as a rivet, a bolt, and the like, that electrically and mechanically connects the ground region 54 with the communication terminal 38N.

As shown in FIG. 4, by providing the ground region 54A in a planar form, the surface area of the portion that causes the heat sink 20 to planarly contact the circuit board 18 can be widened, and the heat sink 20 can be stably fixed to the circuit board 18. An output shaft communicating portion 14A, with which the output shaft 14 communicates, is provided in a vicinity of the central portion of the circuit board 18. Power supply terminals 36A, 36B, 36C, that supply electric power to the respective U-phase, V-phase and W-phase windings 26 of the stator 24, are provided at the periphery of the output shaft communicating portion 14A.

Figure 5:
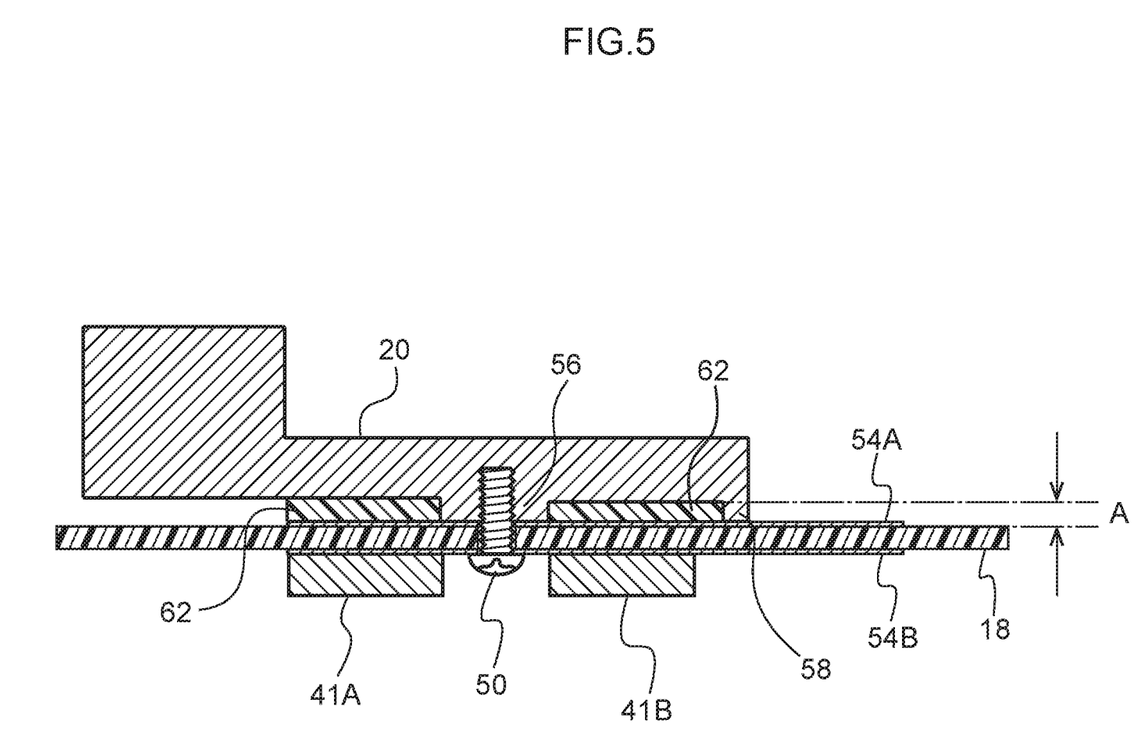
FIG. 5 is a schematic drawing showing the joining of the circuit board and a heat sink.

FIG. 5 is a schematic drawing that shows the joining of the circuit board 18 and the heat sink 20. The heat sink 20 has projecting portions 56 and 58 at which portions, that are at the side that is mounted to the circuit board 18, project-out further than the other portions of the heat sink 20.

The projecting portions 56 and 58 abut and planarly-contact the ground region 54A of the circuit board 18. The heat sink 20 is mounted to the circuit board 18 by a fixing bolt 50 in a state in which the projecting portions 56 and 58 abut the ground region 54A of the circuit board 18. It is desirable that the peak portions of the projecting portions 56 and 58, and in particular, the peak portion of the projecting portion 56 that has a large surface area, are flat surfaces so as to abut in parallel and planarly-contact the ground region 54A of the circuit board 18.

A member 62 for insulation is provided between the heat sink 20 and the region, other than those abutted by the projecting portions 56 and 58, of the circuit board 18. It suffices for the member 62 for insulation to be, for example, silicone grease that is insulative, or a silicone resin that is gel-like at normal temperatures and that hardens due to the generation of heat by the elements such as the FET and the like, or a member for insulation that is solid and is formed from a rubber or a resin or the like that is flexible.

The circuit board 18 has a ground region 54B on a face that is the back face of the face, on which, the FET and the like, that is, the heat sink 20 and the ground region 54A are mounted. As shown in FIG. 5, the ground region 54B is electrically connected with the heat sink 20 and the ground region 54A via a fixing bolt 50 made of metal. The ground region 54B may be electrically connected with the ground terminal 38N of the connecter 38 via the terminal connection portion 54N and the communication terminal 38N1, or a member similar to the terminal connection portion 54N and the communication terminal 38N1. The ground region 54B is electrically connected with the ground terminal 38N, via the heat sink 20 and the ground region 54A, or via the terminal connection portion 54N and the communication terminal 38N1 or the member similar to the terminal connection portion 54N and the communication terminal 38N1. The ground region 54B is connected with the vehicle main body via the harness that is connected with the ground terminal 38N.

Figure 6:
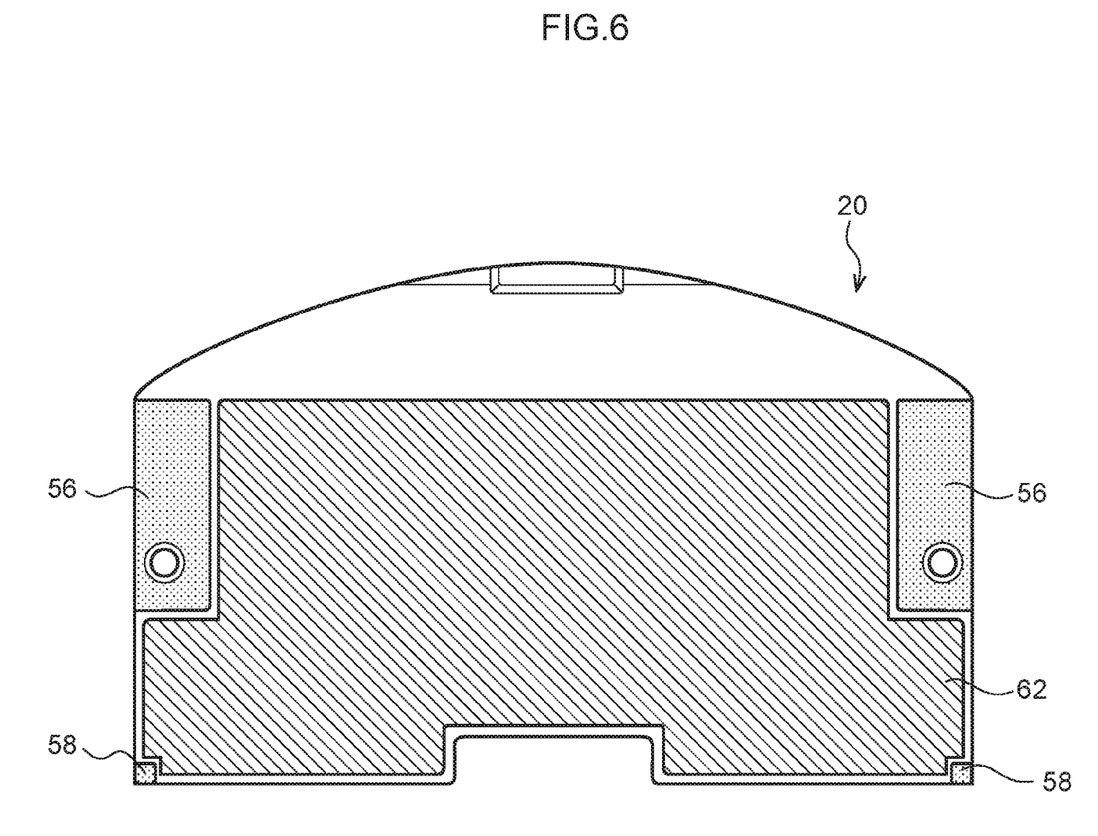
FIG. 6 is a schematic drawing showing an example of the side, that is mounted to the circuit board, of the heat sink.

FIG. 6 is a schematic drawing showing an example of the side, that is mounted to the circuit board 18, of the heat sink 20. The projecting portions 56 and 58 are provided at portions corresponding to the four corners of the surface that is substantially rectangular, and abut the ground region 54A of the circuit board 18.

In FIG. 6, the region marked by hatching is the portion where the member 62 for insulation is provided. In a case in which the heat sink 20 is mounted to a predetermined position of the circuit board 18, the hatched portion of FIG. 6 covers portions, that correspond to places of packaging FETs 41A and 41B and the like (see FIG. 5) that structure the inverter circuit, at the reverse surface that is at the side where the FETs 41A and 41B and the like are packaged.

In the present embodiment, in order to achieve both insulation and heat dissipation between the circuit board 18 and the heat sink 20, dimension A of the gap into which the member 62 for insulation is filled in FIG. 5, i.e., the thickness of the member 62 for insulation, is optimized.

The thickness of the member 62 for insulation depends on factors such as the height of the projecting portions 56 and 58, warping of the circuit board 18, thermal deformation of the circuit board 18, the flatness of the projecting portions 56 and 58, and the like. In the present embodiment, it is preferable that the thickness of the member 62 for insulation be a thickness of an extent that is such that heat dissipation is carried out reliably while the requisite insulation is ensured.

(Operation and Effects of Present Embodiment)

Operation and effects of the present embodiment are described next.

As shown in FIG. 2 and FIG. 3, at the motor driving control device 10 for a vehicle of the present embodiment, the electrically-conductive plate 32A that is electrically conductive is disposed at the surface of the upper case 32, and the lower bearing member 15A, that is provided at the output shaft 14, and the heat sink 20 are electrically connected via the electrically-conductive plate 32A. The lower bearing member 15A, the output shaft 14 and the rotor 22 are respectively made of metal, and the lower bearing member 15A is disposed at the output shaft 14, and the output shaft 14 is structured integrally with the rotor 22. Accordingly, in the present embodiment, the rotor 22 and the output shaft 14 and the lower bearing member 15A are electrically connected to one another.

The heat sink 20 is electrically connected to the ground region 54A and 54B (FIG. 5) on the circuit board 18. The ground region 54A and 54B on the circuit board 18 is electrically connected to the ground terminal 38N of the connector 38 via the circuit pattern on the circuit board 18, the terminal connection portion 54N, and the communication terminal 38N1. Moreover, the ground terminal 38N of the connector is, via the harness, grounded at the vehicle main body.

As a result, in the present embodiment, electrical connection of the rotor 22, the output shaft 14, the lower bearing member 15A, the electrically-conductive plate 32A, the heat sink 20, the ground region 54A and 54B, and the ground terminal 38N of the connector 38 is possible, and, for example, the potential that has accumulated at the rotor 22 can be grounded from the ground terminal 38N of the connector 38 through the harness to the vehicle main body. As a result, in the present embodiment, in a case in which a potential difference arises at the rotor 22 or the output shaft 14 with respect to the circuit board 18, this potential difference is eliminated by current 60 that is shown by the arrows in FIG. 2, and balance of the potentials of the respective portions of the device can be devised.

In the present embodiment, electrical connection from the rotor 22 all the way to the ground terminal of the connector 38 as described above is made possible by disposing the electrically-conductive plate 32A, that is structured by a thin metal plate or metal plating, at the surface, whose material is insulative, of the upper case 32.

Further, at the time of combining the upper case 32 and the lower case 48, the circuit board 18 is fixed to a predetermined position within the space that is formed at the interior of the upper case 32 and the lower case 48. Because the circuit board 18 is not fixed by members such as clip members that give rise to stress at the circuit board 18, damage to the circuit board 18 can be prevented.

The electrically-conductive plate 32A, that bears the electrical connection between the lower bearing member 15A and the heat sink 20, is a simple structure of a thin metal plate or metal plating that is disposed along the surface of the upper case 32. Further, at the time of fastening the upper case 32 and the lower case 48 together by the fixing bolts 64 with the circuit board 18, to which the heat sink 20 is attached, sandwiched between the upper case 32 and the lower case 48, the electrically-conductive plate 32A is electrically connected by being nipped by the heat sink 20 and the upper case 32. Therefore, the electrically-conductive plate 32A can be inexpensively and easily be applied to the motor driving control device 10 for a vehicle that relates to the present embodiment.

As shown in FIG. 2 and FIG. 3, the place, that is nipped by and contacts the heat sink 20, of the electrically-conductive plate 32A is made to be large to the extent permitted by the dimensions of the upper case 32 and the heat sink 20. Further, in accordance with the shape of the surface of the upper case 32, the one end, that contacts the lower bearing member 15A, of the electrically-conductive plate 32A extends all the way to the inner wall of the lower bearing member holding portion 40 that is shaped as a hole and in which the lower bearing member 15A is fit. As a result, the surface area of contact of the heat sink 20 and the electrically-conductive plate 32A, and the surface area of contact of the electrically-conductive plate 32A and the lower bearing member 15A, are ensured sufficiently, and the electrical connection from the rotor 22 via the output shaft 14, the lower bearing member 15A and the electrically-conductive plate 32A all the way to the heat sink 20 is reliable. The electrical connection from the heat sink 20 via the circuit board 18 to the ground terminal 38N becomes also reliable.

As described above, in accordance with the present embodiment, a motor driving control device for a vehicle, that can aim for balance of the potentials of the respective portions by a simple structure, can be obtained.

Note that the rotor 22 in the present embodiment corresponds to the rotating body of the claims. Further, the lower bearing member 15A corresponds to the bearing member, the heat sink 20 corresponds to the heat dissipating member, the upper case 32 corresponds to the supporting member, the electrically-conductive plate 32A corresponds to the electrically-conductive member, and the lower bearing member holding portion 40 corresponds to the bearing member holding portion.

What is claimed is:

1. A motor driving control device for a vehicle, comprising:
    a motor having a rotating body that rotates due to application of a magnetic field generated by voltage applied to windings, an output shaft that is structured integrally with the rotating body, and a bearing member that holds the output shaft such that the output shaft rotates freely;
    a circuit board on which is packaged a circuit that generates the voltage applied to the windings, the circuit board having a ground region;
    a heat dissipating member that dissipates heat from the circuit board, and that is electrically connected to the ground region on the circuit board;
    a supporting member that holds the circuit board and the bearing member, and that has an insulating surface; and
    an electrically-conductive member that is provided at a surface of the supporting member, and that, by electrically connecting the bearing member and the heat dissipating member, grounds the rotating body, the output shaft and the bearing member.

2. The motor driving control device for a vehicle of claim 1, wherein:
    the supporting member has a bearing member holding portion that holds the bearing member, and
    a first end of the electrically-conductive member extends to an inner wall of the bearing member holding portion and planarly-contacts a peripheral direction side surface of the bearing member, and, at a time when the circuit board, on which the heat dissipating member is packaged, is held by the supporting member, a second end of the electrically-conductive member contacts the heat dissipating member.

3. The motor driving control device for a vehicle of claim 2, wherein:
    the inner wall of the bearing member holding portion has an accommodation recess for holding the bearing member, and
    the first end of the electrically-conductive member is accommodated in the accommodation recess of the bearing member holding portion.

4. The motor driving control device for a vehicle of claim 2, wherein:

the heat dissipating member has a region that faces the supporting member at the time when the circuit board, on which the heat dissipating member is packaged, is held by the supporting member, and at the time when the circuit board, on which the heat dissipating member is packaged, is held by the supporting member, the second end of the electrically-conductive member is nipped by the supporting member and by the region of the heat dissipating member that faces the supporting member.

5. The motor driving control device for a vehicle of claim 1, wherein a potential of the ground region of the circuit board is a ground potential due to a connector member that is electrically connected to the ground region.

* * * * *